March 30, 1965  F. O. JOHNSON  3,175,438
METHOD AND APPARATUS FOR APPORTIONING THE
WEIGHT OF A WORKPIECE FOR CUTTING
Filed Aug. 7, 1962
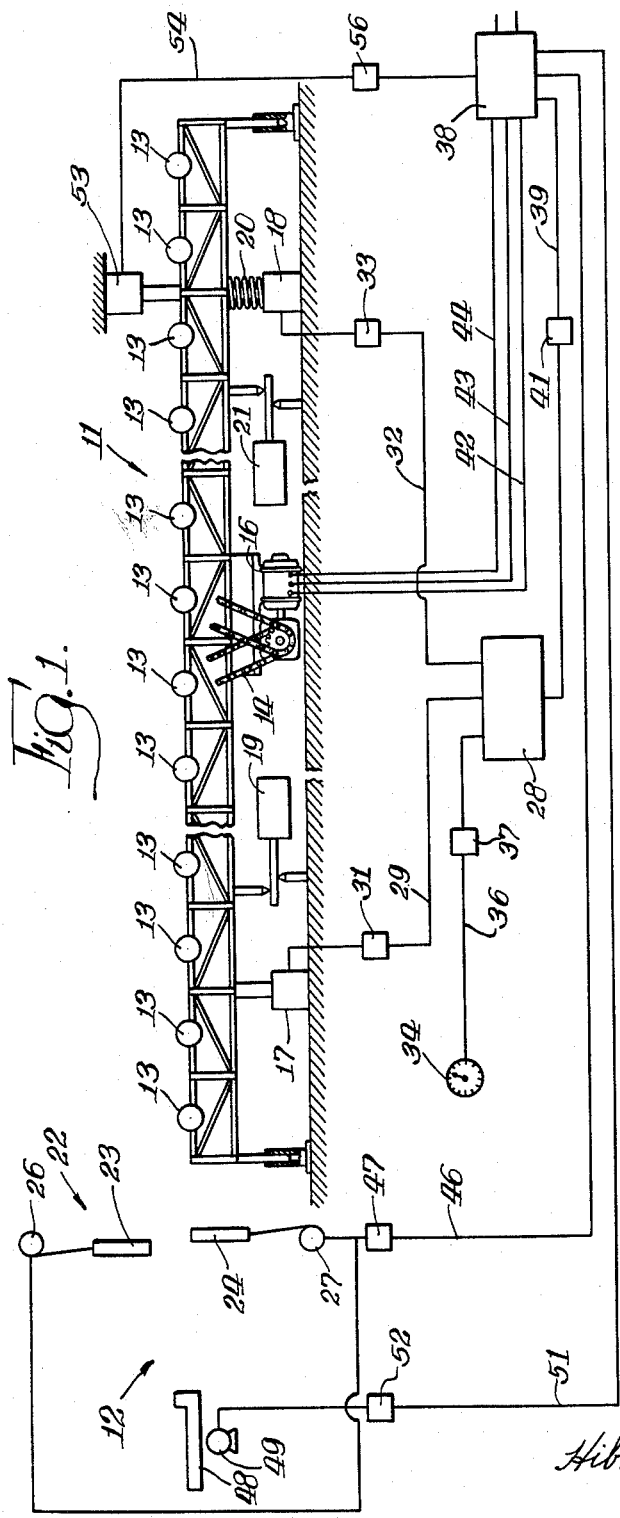
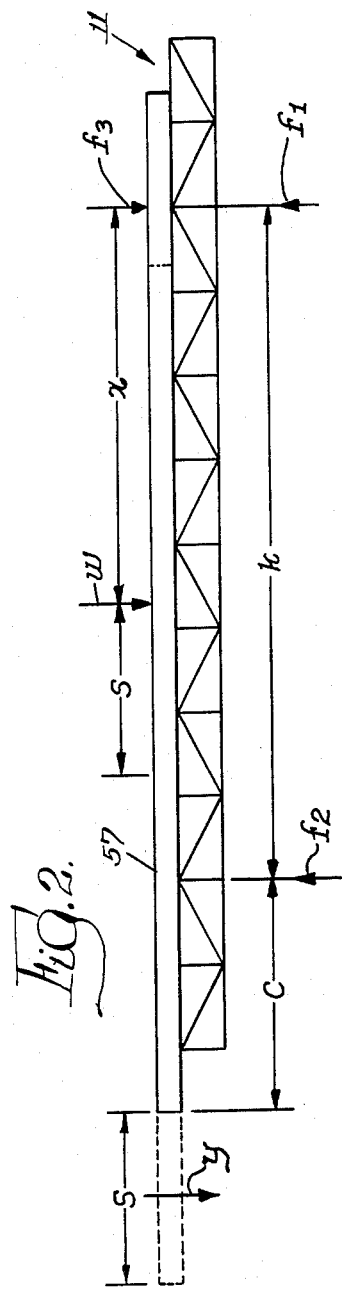
INVENTOR.
Frederick O. Johnson
BY
Hibben, Noyes & Bicknell
Atty's.

United States Patent Office 3,175,438
Patented Mar. 30, 1965

3,175,438
METHOD AND APPARATUS FOR APPORTIONING THE WEIGHT OF A WORKPIECE FOR CUTTING
Frederick O. Johnson, 9653 S. Hamlin Ave., Evergreen Park, Ill.
Filed Aug. 7, 1962, Ser. No. 215,434
18 Claims. (Cl. 83—13)

This invention relates to measuring apparatus and more particularly to a novel mode of precisely apportioning a bar of material, which previously may not have been measured, into portions of preselected weight.

It will be seen from the following description that the present invention is particularly useful in steel rolling mills and the like, and the invention will be described in that environment. However, it will also be apparent that the invention can easily be adapted for use in other environments where measuring and apportioning of bar-like materials is important.

In a steel rolling mill a cast ingot of steel may be converted into bar or sheet stock and this conversion requires several rolling and cutting operations. Initially, the raw ingot of steel is rolled in a billet or blooming mill to elongate the ingot. The resulting elongated ingot is then cut or sheared into a plurality of lengths or units of a size suitable for rerolling into bars or sheets and the like.

Heretofore, such units have been cut to a predetermined length. However, while it is attempted to maintain some uniformity in cross-sectional size of the ingots, such uniformity is difficult to attain and consequently when predetermined lengths are cut from different ingots, such lengths will vary in weight. Although each ingot will be substantially uniform in cross-sectional size throughout its length, no two ingots can be expected to have the same cross-sectional area. There are several factors causing the variation in area, such as width, thickness, corner configuration and temperature. Hence, measurements have not proved to be exact, and a considerable amount of waste has occurred because units uniform in weight have not been obtained.

It is a primary object of the present invention to improve accuracy and speed in apportioning bar material and the like.

Another object is to provide apparatus for quickly, precisely and automatically apportioning bar material and the like.

Still another object is to provide shearing and apportioning apparatus for use in rolling mills and the like, which apparatus will eliminate the need for close control of dimension in blooming mill operations, yet will reduce waste and improve efficiency of the mill.

Another object of the invention is to provide measuring apparatus capable of indirectly calculating various factors, such as length and cross-sectional area of a bar of material.

Other objects and advantages of the invention will be apparent from the following description taken in conjunction with the accompanying drawing, wherein;

FIG. 1 is a diagrammatic view of apparatus embodying a preferred form of the invention, and FIG. 2 is a force and moment diagram of the structure shown in FIG. 1, to show the factors used for the calculations.

The present invention, in its most rudimentary form, comprises means for supporting a bar or the like, a pair of longitudinally spaced weighing devices, and means defining a location or initial position for one end of such bar. The weighing devices are located a predetermined distance apart and the location defining means defines a line that is a certain distance from one of the weighing devices. With this arrangement, the measuring devices cooperate with the support means to weigh such bar and, at the same time, the weighing devices determine how the weight of the bar is distributed. With this information, and assuming that the bar is substantially uniform in cross-section throughout its length, apportionment of such bar can easily be calculated. Also, other important information about such bar, such as for example its length and cross-sectional area, can be calculated.

A practical form of the invention will, of course, be more refined than the above described rudimentary form. When used in a steel rolling mill, for example, the apparatus will include means for longitudinally shifting such bars on the supporting means or table. Also, it is important that calculations be made swiftly and other operations be performed automatically. Accordingly, the weighing devices are preferably of the kind that produce electric signals which indicate the weights measured, and a conventional form of computer receives the signals, performs the calculations and operates portions of the apparatus automatically.

FIG. 1 of the drawings shows, diagrammatically, a preferred form of apportioning apparatus embodying the invention. This form is adapted for use in a rolling or blooming mill where bars to be apportioned will be very hot and, of course, very heavy. The apparatus, in the present form, comprises bar supporting means indicated generally at 11, bar positioning means, indicated generally at 12, and weighing and control apparatus.

In a blooming or rolling mill the bars to be apportioned may be many feet in length and may weigh several tons. Accordingly, the supporting means 11 is, in the present instance, an elongated table or platform fabricated in the form of a truss, as shown, to be relatively rigid throughout its length and sufficiently strong to support the great weight involved. The open truss form of the table permits heat from the bars to escape without harming the various components of the apparatus.

Because of the weight and high temperatures involved, it is desirable that the apparatus include mechanical means for longitudinally shifting the bars relative to the table. For this reason the table is provided with a plurality of longitudinally spaced transversely extending rollers 13. Some or all of the rollers 13 may be motor driven and, in the present instance, the middle two rollers are shown connected by chain drives 14 through a reversible electric motor 16 carried by the table 11. Operation of the motor will, of course, cause the rollers 13 connected thereto to rotate, thereby shifting a bar resting thereon longitudinally of the table 11. The direction of shifting is determined by the direction of motor operation.

To effect the measurements contemplated, the apparatus measures the distribution of weight when the bar is located at a certain position. Thus, table 11, spans a pair of longitudinally spaced weighing devices, in this instance load cells 17 and 18, located a certain known distance apart, which distance is shown as $k$ in FIG. 2. Although the load cells 17 and 18 could be made to support the entire weight of the table 11 and a bar carried thereby, in the present apparatus the weight of the table is supported by counterbalances 19 and 21. Thus, the load cells 17 and 18 are required to support only the weight of such bar. A spring 20, capable of carrying the maximum load limit of load cell 18, is interposed between load cell 18 and the table 11. Load cell 17 is in direct contact with the table 11. Each of the load cells 17 and 18 provides an electrical signal that indicates the amount of weight supported thereby. The weight supported by load cells 17 and 18 are shown as forces $f_2$ and $f_1$ respectively in FIG. 2. Hence, a bar of material located on the table 11 will be weighed by the load cells 17 and 18. The weight of such bar, illustrated as force $w$ in FIG. 2, is the sum of forces $f_1$ and $f_2$, the measurements made by the load cells 17 and 18. The load cells 17 and 18, being located the certain distance $k$ apart and respectively providing separate weight measurements, thereby establish how the weight $w$ of such bar is distributed. The relative position of the load cells 17 and 18 may, under certain circumstances be changed, but the distance between them must always be known.

It is possible to indirectly establish the length of such bar in a convenient manner without actually measuring such length. To do this it is important to have one end of such bar positioned at a certain known location with respect to one of the load cells. Thus, the present apparatus includes the means 12 for defining such location. Also, the present apparatus is intended ultimately to cut such bar into lengths, and the apparatus is provided with cutting means such as a shear 22. The shear 22 is illustrated as having a pair of blades 23 and 24 that are driven together by electric motors 26 and 27 respectively, thereby cutting or shearing such bar on a line defined by the adjacent edges of the shear blades 23 and 24. The distance from the line to the load cell 17 is known and is shown as $c$ in FIG. 2. For convenience this same line is used as the initial position of the one end of the bar during measurement. Hence, the shear 22 also serves, in this instance, to provide the position defining means.

In the present apparatus all calculations are made automatically by the apparatus. To this end the apparatus is provided with a conventional form of computer, represented by the block 28. The computer 28 is connected to the load cell 17 by a conductor 29 through a transducer 31. The computer 28 is also connected to the load cell 18 by a conductor 32 through a transducer 33. The transducers 31 and 33, and other transducers hereinafter mentioned, are conventional devices for converting the signals received so they can be used by the various associated devices, such as the computer 28 and the shear 22.

Also attached to the computer 28 is a device 34 having a dial, by which an operator can select a certain weight which he desires to separate from a bar. The device 34 is connected to the computer 28 by a conductor 36 through a transducer 37.

The computations made by the computer 28 are used to automatically operate the apparatus, such as to effect the shift of such bar along the table to a calculated position. To this end, the apparatus is provided with a conventional form of controller, indicated by the block 38. The controller 38 is connected to the computer 28 by a conductor 39 through a transducer 41.

The controller 38 can effect a longitudinal shift of such bar in either direction. To this end, the controller 38 is connected by suitable conductors 42, 43 and 44 to the drive motor 16. Hence, the controller 38 will operate the drive motor 16 in an appropriate direction to shift a bar toward or away from the shear 22, when such is required by the computer.

The controller 38 also operates the shear 22. Thus, controller 38 is connected by a conductor 46 to the shear motors 26 and 27 through a transducer 47. When the bar reaches a position calculated for cut-off, the controller 38 will automatically operate the shear 22.

If several portions of equal weight are to be severed from a bar, each will be of the same length and it is ordinarily unnecessary to recalculate that length for each portion. To avoid such recalculation, the present apparatus includes an adjustable stop 48 located beyond the shear 22. The stop 48 can be brought into contact with the end bar the first time the bar is positioned for shearing and, thereafter, the bar can be repeatedly cut and advanced into engagement with the stop 48 until completely apportioned. Of course, the portions cut from the bar will be of equal weight. The stop 48 is preferably adjusted by the controller 38 and an adjusting motor 49. The motor 49 is connected to the controller 38 by a conductor 51 through a transducer 52.

The present apparatus also includes a follow-up system for insuring that the bar has shifted the amount calculated by the computer 28. To this end, the apparatus is provided with an additional load cell 53 which engages the table 11. The load cell 53 is arranged to continuously measure the change in weight, shown as $f_3$ in FIG. 2, at the load cell 18 as the bar is shifted and supplies an appropriate signal to the controller 38. Thus, the load cell 53 is connected by a conductor 54 through a transducer 56 to the controller 38. When a bar has been shifted longitudinally the calculated amount, the load cell 53 will actuate the controller 38 and the controller 38 will, in turn, stop the drive motor 16.

FIG. 2 of the drawing diagrammatically shows a bar of material 57 positioned on the table 11. FIG. 2 also shows certain distances and forces needed for computing cut-off points. The rollers 13 and other parts of the apparatus not affecting the computations have been eliminated from FIG. 2. Of course, the following computations could be made by an operator, but it is preferable that a computer, such as 28, be used for this purpose.

It is apparent, from the foregoing description and from what can be determined from FIG. 2, that the following relationships exist. The total weight $w$ of a bar is equal to the sum of reaction forces $f_1$ and $f_2$. Thus, $w = f_1 + f_2$. For computing moments, $w$ can be considered as acting at the center of the bar as shown since the center of the bar in this instance is the center of gravity. Also, when the bar is at rest, the sum of moments about either reaction point $f_1$ or $f_2$ must be equal to zero. Then, if moments are taken about the load cell 18, the force $f_2$ multiplied by its lever arm, the distance $k$, must equal the total weight $w$ of the bar multiplied by its lever arm, the distance $x$ from the center of the bar to the load cell 18. Thus, $f_2 k = wx$. Since $f_2$ and $w$ are measured by the apparatus and $k$ is known, $x$ can be calculated using the equation $$x = \frac{f_2 k}{w}$$

Once the distance $x$ is solved, the total length $L$ of the bar can be calculated, for $w$ is located midway between the ends of the bar, that is at a distance $L/2$ from either end. And from FIG. 2 it is apparent that $L/2$ is equal to the distance $c$ from the shear to the load cell 17 plus the distance $k$ from load cell 17 to the load cell 18, minus the distance $x$ from load cell 18 to $w$, thus $L/2 = c + k - x$, or $L = 2(c + k - x)$.

Thus, knowing the total length $L$ of the bar and the total weight $w$, the weight of a unit or piece of given length or the length of a piece of given weight or a piece having a certain percentage of the total length or weight may be determined.

Based on the preceding equations, it is a simple matter for the computer 28 to calculate precisely how far such bar should be shifted in the direction of the shear to provide a portion having a selected weight, shown as $y$ in FIG. 2, which may be set on the device 34. Such shift is preferably computed in terms of a weight change at one of the load cells. This arrangement permits a simple cross-check by the third load cell 53. However, the shift could also be computed in terms of distance, such as the distance $s$, which is the distance the end of the bar is shifted beyond the shear.

Analysis shows that the change in force at load cell 18, which for convenience will be called $f_3$, can be calculated from the following formula:

$$f_3 = 2y\left(\frac{c}{k} + \frac{f_1}{f_1 + f_2}\right)$$

When a change in force of the magnitude $f_3$ is registered by the load cell 53, the proper amount of shift has been accomplished.

If it should be desirable to calculate such shift in terms of length, analysis similarly shows that the shift, $$s = \frac{2y(k+c-x)}{w}$$

Of course, other information about such bar, such as cross-sectional area and the like, can be similarly calculated by the computer 28 from information readily available about such bar.

It is also a simple matter to program the computer 28 to divide a bar in terms of percentage of the whole bar. Thus, assuming it is desired to separate the bar into increments each of $p\%$ of the whole, it can be demonstrated that the force change, $$f_3 = \frac{2p}{100}\left(f_1 + \frac{cw}{k}\right)$$

The apparatus shown in FIG. 1 operates in the following manner. With no load on the table 11, the load cells 17 and 18 are adjusted to reflect zero weight. A bar, shown at 57 in FIG. 2, is then moved on to the table 11 and is shifted by the rollers 13 toward the left end of the table as shown in FIG. 1. When the left end of the bar 57 reaches the line defined by the shear 22, the load cells 17 and 18 measure the forces $f_1$ and $f_2$ shown in FIG. 2 and send their load signals through transducers 31 and 33 to the computer 28. The computer receives from the device 34 a signal representing the command for the weight to be parted. The computer 28 then calculates, according to formula such as has been previously described, the magnitude of the change in force $f_3$ that will provide the specified weight in the portion separated. The computer then actuates the controller 38, which causes motor 16 to operate and shift bar 57 into the shears. As the bar shifts load cell 53 indicates the change in force $f_3$. When the magnitude of $f_3$ indicates that the shift is completed, the load cell 53 signals the controller 38 and the controller 38 in turn stops the motor 16. If the bar 57 should happen to overshoot the proper position with respect to the shear 22, signals from one or more of the load cells 17, 18 or 53 will cause the controller 38 to bring the bar 57 back to the desired position. When the bar 57 is properly positioned for cutting, as indicated by the signals from one or more of the various load cells, and particularly load cell 53, the controller 38 activates the shear 22, causing it to cut the bar 57.

If the whole bar 57 is to be divided into units of equal weight, the entire process can be repeated until the bar has been completely divided. However, the whole can also be divided by adjusting the stop 48, by signal from the controller 38, to touch the end of the first unit weighed just prior to cutting by the shears 22. Thereafter, the bar 57 can be moved into engagement with the stop 48 after each cutting of the bar, and recalculation need not be done until the bar is completely divided. The stop 48, of course, will likely need to be reset each time a new bar is to be divided.

With the apparatus set to calculate the proper length $s$ for the first unit and for setting the stop 48, the controller 38, of course, could be arranged to eliminate the necessity for further calculations in cutting the pieces from the first bar and the shear could be actuated automatically each time that the bar is moved into engagement with the stop 48. When a new bar is placed on the table 11, the increased weight thereof could then be utilized to put the controller 38 again under control of the computer 28, and the apparatus would then operate as in the case of the first bar.

From the foregoing, it is apparent that the present invention provides apparatus for precisely apportioning the bars and the like. This apparatus takes much of the approximation out of apportioning bar material. The apparatus is particularly useful in steel rolling mills and the like and will improve performance of such rolling mills by substantially reducing waste due to inability to closely control the many variables involved.

I claim:

1. A method of apportioning bar material, comprising measuring the total weight of such bar, measuring the distribution of said weight between two known points when one end of such bar is precisely positioned on a preselected line, calculating from the measurements thus made the length of such bar for a preselected weight, shifting said bar longitudinally the calculated length beyond said line, and cutting said bar on said line.

2. A method of apportioning bar material, comprising measuring the total weight of such bar and simultaneously measuring the distribution of said weight between two known points when one end of such bar is positioned on a preselected line, calculating from the measurements thus made the length of such bar for a preselected weight, and cutting said calculated length from an end of said bar.

3. A method of apportioning bar material, comprising positioning such bar on two longitudinally spaced weighing devices at a predetermined location thereon, measuring the total weight of such bar, measuring the distribution of weight of such bar at said device, calculating from the measurements thus made the length of such bar for a selected portion of said total weight, and cutting said calculated length from an end of such bar.

4. A method of apportioning bar material, comprising positioning such bar on two longitudinally spaced weighing devices at a predetermined location thereon, measuring the total weight of such bar, measuring the distribution of weight of such bar at said devices, calculating from the measurements thus made the length of such bar for a selected portion of said total weight, shifting such bar longitudinally an amount equal to the calculated length, and cutting the calculated length from an end of such bar.

5. A method of apportioning bar material comprising positioning such bar on two longitudinally spaced weighing devices at a predetermined location thereon, measuring the total weight of such bar, measuring the distribution of weight of such bar at said devices, calculating from the measurements thus made the length of such bar for a selected portion of said total weight, shifting said bar longitudinally toward one end an amount equal to the calculated length, setting a stop in engagement with the one end of the bar, cutting said calculated length for said one end, and after the first cut moving the bar to the stop for a subsequent cut.

6. A method of apportioning bar material, comprising positioning such bar on two longitudinally spaced weighing devices at a predetermined location thereon, measuring the total weight of such bar, measuring the distribution of weight of such bar at said devices, calculating from the measurements thus made and in terms of a net change in force at a certain location the length of such bar for a selected portion of said total weight, shifting said bar longitudinally and at the same time continuously measuring the change in force at said location, stopping said bar when the measured net change in force is equal to the calculated net change in force, and cutting the selected portion from said one end of the bar.

7. Apportioning apparatus comprising a pair of weighing devices located in horizontally spaced relation a known distance apart, a table spanning said devices and adapted to carry an elongated bar of undetermined length and weight, said devices being responsive to the weight of the bar on said table, means defining a line at a certain position with respect to one of said devices, said devices being adapted, when an end of said bar is at said line, to measure the total weight of such bar and at the same time to measure the distribution of such weight between said devices, and calculator means responsive to the measurements made by said devices, said weighing devices and calculator means being effective to apportion said bar into units having a predetermined characteristic.

8. Apparatus according to claim 7, including a shear for cutting such bar into segments, said shear being adjacent one end of said table and having cutting edges defining said line.

9. Apparatus according to claim 7, in which said table includes means mounted thereon for longitudinally shifting such bar to bring an end thereof to said line.

10. Apparatus according to claim 9, in which said shifting means comprises a plurality of longitudinally spaced rollers, at least some of which are driven.

11. Apportioning apparatus comprising a pair of weighing devices located in horizontally spaced relation a known distance apart, a table spanning said devices and adapted to carry an elongated bar of undetermined length and weight, means for shifting such bar longitudinally on said table, means cooperating with said shifting means for initially locating one end of such bar at a certain position a known distance from one of said devices, said devices being adapted when said one end of said bar is at said certain position to measure the distribution of weight between said devices, and computer means responsive to said devices for calculating from said measurements a length of such bar which will have a predetermined weight and for actuating said shifting means to subsequently locate said one end at another position such that said length can be sheared from said bar.

12. Apparatus according to claim 11, including a shear mechanism operable to cut said bar into lengths and to stop one end of such bar at an initial position a known distance from one of said devices, said computer means calculating said shift and actuating said shifting means to effect the calculated shift of such bar and actuating said shear means when the shift is completed, thereby automatically cutting a length of preselected weight from such bar.

13. Apparatus according to claim 12 in which said weighing devices are load cells engaging said table and operable to provide electric signals for said computer means indicating the weight measured by each load cell.

14. Apparatus according to claim 13 including a third load cell in engagement with said table, said third load cell being operable to measure changes in loading at one of the other load cells in response to shifting of such bar.

15. Apparatus according to claim 13, including a third load cell in engagement with said table and operable to measure changes in load at one of the other load cells and to provide a signal for said computer means for stopping said shifting means when such bar has shifted to the proper position for cutting by said shear means.

16. Apportioning apparatus comprising a pair of load cells located in horizontally spaced relation, a table adapted to support an elongated bar of undetermined weight and length, said table having means for selectively shifting such bar axially in either direction, said table being counterbalanced and said load cells engaging said table to respond to the weight of such bar when carried by said table, computer means responsive to said pair of load cells and operable to calculate how far to shift such bar to provide a portion having a certain preselected weight and operable to actuate said shifting means to effect said shift, and follow-up means cooperating with said table for indicating to said computer means the completion of said shift, thereby causing said computer means to stop said shifting means.

17. Apportioning apparatus comprising a horizontal weighing table, means for positioning a bar of material on said table with an end of the bar located at a certain position relative to an end of said table, said positioning means including means for shifting the bar in either direction longitudinally of said table, a pair of longitudinally spaced load cells engaging said table for measuring both the total weight of the bar and the distribution of said weight on said table, computer means responsive to signals provided by said load cells, bar cutting means located at said certain position, and adjustable stop mechanism located on the opposite side of said cutting means from said end of said table, said computer means being adapted to adjust said stop and to operate said shifting means to bring the end of such bar against said stop and thereafter to operate said bar cutting means.

18. Apportioning apparatus comprising a table and a pair of weighing devices engaging said table for weighing a bar of material located on said table with one end of the bar at a predetermined distance from one of said devices, said devices being positioned in horizontally spaced relation a known distance apart for measuring the distribution of the weight of such bar between said devices, whereby said bar can be precisely apportioned.

References Cited by the Examiner
UNITED STATES PATENTS

| | | | |
|---|---|---|---|
| 2,792,890 | 5/57 | Dyken | 83—209 |
| 2,815,074 | 12/57 | Dehn | 83—268 |
| 2,989,883 | 6/61 | Zimsky et al. | 83—208 |
| 3,066,562 | 12/62 | Barnett et al. | 83—74 |

LEON PEAT, *Primary Examiner.*

HUNTER C. BOURNE, Jr., *Examiner.*